(12) United States Patent
Kreitman

(10) Patent No.: US 9,876,199 B2
(45) Date of Patent: Jan. 23, 2018

(54) BATTERIES COMPRISING A MULITLAYER DIELECTRIC AND SEALING FILM AND METHOD OF MAKING THE BATTERIES

(71) Applicant: BRIGHTVOLT, INC., Lakeland, FL (US)

(72) Inventor: Neil Kreitman, Floral City, FL (US)

(73) Assignee: BrightVolt, Inc., Redmond, WA (US)

( * ) Notice: Subject to any disclaimer, the term of this patent is extended or adjusted under 35 U.S.C. 154(b) by 146 days.

(21) Appl. No.: 14/775,198

(22) PCT Filed: Mar. 14, 2014

(86) PCT No.: PCT/US2014/027032
§ 371 (c)(1),
(2) Date: Sep. 11, 2015

(87) PCT Pub. No.: WO2014/152171
PCT Pub. Date: Sep. 25, 2014

(65) Prior Publication Data
US 2016/0036012 A1     Feb. 4, 2016

Related U.S. Application Data

(60) Provisional application No. 61/781,514, filed on Mar. 14, 2013.

(51) Int. Cl.
*H01M 2/02*       (2006.01)
*H01M 2/08*       (2006.01)
(Continued)

(52) U.S. Cl.
CPC ......... *H01M 2/0267* (2013.01); *H01M 2/026* (2013.01); *H01M 2/029* (2013.01); *H01M 2/0212* (2013.01); *H01M 2/0277* (2013.01); *H01M 2/0287* (2013.01); *H01M 2/08* (2013.01); *H01M 2/26* (2013.01);
(Continued)

(58) Field of Classification Search
None
See application file for complete search history.

(56) References Cited

U.S. PATENT DOCUMENTS 5,057,385 A    10/1991    Hope et al.
5,326,653 A    7/1994    Chang
(Continued)

FOREIGN PATENT DOCUMENTS

EP    0997955 A1 *    5/2000    ............ H01M 2/021
EP    2012376 A1 *    1/2009    .............. H01M 2/06
(Continued)

*Primary Examiner* — Scott J Chmielecki
(74) *Attorney, Agent, or Firm* — Maier & Maier, PLLC

(57) ABSTRACT

A multilayer dielectric and sealing film is disclosed. The multi-layer dielectric sealing film comprises a layer of dielectric material and at least one layer of sealing material. The multilayer film may be positioned between the current collector tabs and the packaging material of a thin film battery to prevent shorting between the tabs and the edge of a metal foil layer in the packaging material. The multi-layer film also provides additional sealant which can flow around and seal around the terminals. By combining the sealing material and the dielectric material into one multi-layer assembly, manufacturing steps can be eliminated.

28 Claims, 1 Drawing Sheet

(51) Int. Cl.
*H01M 10/04* (2006.01)
*H01M 10/052* (2010.01)
*H01M 10/0585* (2010.01)
*H01M 2/26* (2006.01)

(52) U.S. Cl.
CPC ..... *H01M 10/0436* (2013.01); *H01M 10/052* (2013.01); *H01M 10/0585* (2013.01); *H01M 2220/30* (2013.01)

(56) References Cited

U.S. PATENT DOCUMENTS

| | | | |
|---|---|---|---|
| 6,145,280 A | 11/2000 | Daroux et al. | |
| 6,251,537 B1 * | 6/2001 | Kim | H01M 2/06 429/180 |
| 8,632,909 B2 * | 1/2014 | Lee | H01M 2/0212 429/163 |
| 2006/0147792 A1 | 7/2006 | Nelson et al. | |
| 2006/0263681 A1 * | 11/2006 | Lee | H01M 2/0212 429/176 |
| 2009/0286150 A1 | 11/2009 | Nelson et al. | |
| 2010/0173193 A1 * | 7/2010 | Kim | H01M 2/021 429/178 |
| 2010/0270924 A1 * | 10/2010 | Kaminska | H01L 27/3225 315/51 |
| 2011/0086242 A1 * | 4/2011 | Lee | H01M 2/021 429/7 |
| 2011/0135995 A1 * | 6/2011 | Song | H01M 2/021 429/162 |
| 2011/0287311 A1 * | 11/2011 | Kim | H01M 2/06 429/181 |
| 2012/0064376 A1 * | 3/2012 | Baek | H01M 2/0212 429/7 |
| 2013/0330606 A1 * | 12/2013 | Kwon | H01M 2/021 429/185 |

FOREIGN PATENT DOCUMENTS

| | | |
|---|---|---|
| JP | 2012028055 A | 2/2012 |
| KR | 1020080087192 A | 10/2008 |
| KR | 1020110044513 A | 4/2011 |
| KR | 1020120136888 A | 12/2012 |

* cited by examiner

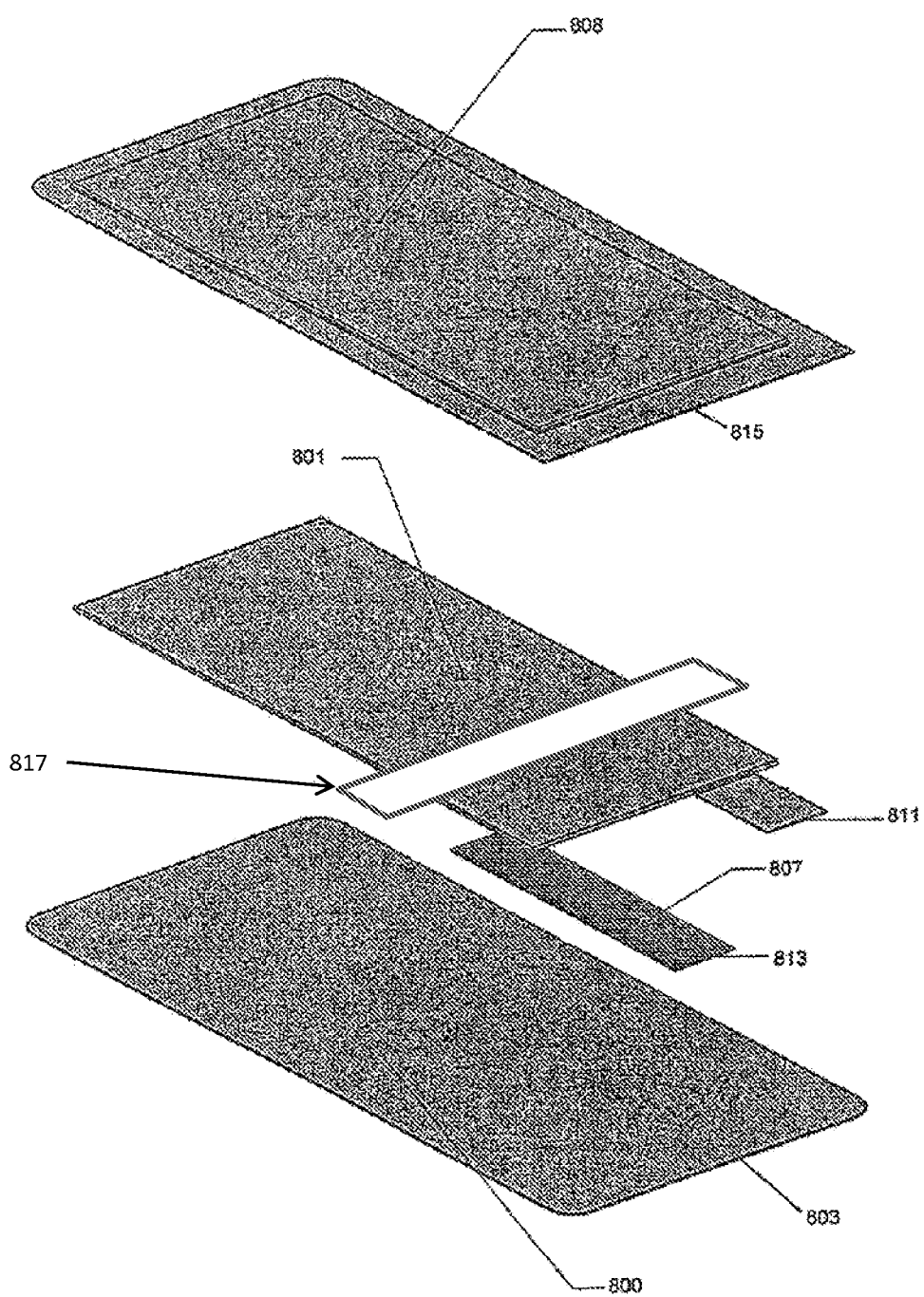

ABATTERIES COMPRISING A MULITLAYER DIELECTRIC AND SEALING FILM AND METHOD OF MAKING THE BATTERIES

This application claims the benefit of Provisional U.S. Patent Application Ser. No. 61/781,514, filed on Mar. 14, 2013, which is incorporated by reference herein in its entirety.

TECHNICAL FIELD

This application relates to batteries comprising a battery cell, one or more tabs extending from the battery cell and a packaging material sealed around the battery cell and to methods of packaging batteries.

BACKGROUND

Thin film battery cell components, such as the anode, cathode and electrolyte, can be sensitive to exposure to the surrounding external environment (e.g., air, oxygen, carbon monoxide, carbon dioxide, nitrogen, moisture and organic solvents). Protective packaging for the battery cell is provided to reduce or eliminate exposure of the battery components to the external environment. For example, a multi-layer film can be sealed around the periphery of the battery cell to serve as protective packaging. Thin film batteries can also have one or more current collector tabs protruding from the battery cell to allow for external electrical contact with the device being powered. These protruding tabs must necessarily extend through the seal in the packaging material. However, the tabs protruding through the seal may compromise the integrity of the seal thereby reducing battery life. In addition, the packaging material may include a metal foil layer to reduce the moisture vapor transmission rate of the packaging material. The edge of the metal layer adjacent the tabs can contact the surface of the tab thereby creating a short.

Accordingly, there still exists a need for improved methods of packaging thin film batteries having one or more protruding tabs which allow for the tabs to extend through the seal in the packaging material without compromising the seal or creating a short between the tabs and metal foil in the packaging material.

SUMMARY

According to a first embodiment, a battery is provided which comprises:

a battery cell having a periphery, the battery cell comprising an anode, a cathode and an electrolyte between the anode and cathode;

an anode tab comprising a first portion in electrical contact with the anode and a second portion extending beyond the periphery of the cell and/or a cathode tab comprising a first portion in electrical contact with the cathode and a second portion extending beyond the periphery of the cell;

an upper packaging layer and a lower packaging layer surrounding the battery cell, wherein the upper and lower packaging layers are sealed together to form a seal area around the periphery of the battery cell and wherein the anode and/or cathode tabs extend between the upper and lower packaging materials in the seal area; and a multi-layer dielectric sealing film between the anode and/or cathode tabs and the upper packaging material in the seal area, wherein the multi-layer dielectric sealing film comprises a layer of dielectric material and a first layer of sealing material.

According to a second embodiment, a method of packaging a battery comprising:

an anode, a cathode and an electrolyte between the anode and cathode forming a battery cell having a periphery;

an anode tab comprising a first portion in electrical contact with the anode and a second portion extending beyond the periphery of the cell and/or a cathode tab comprising a first portion in electrical contact with the cathode and a second portion extending beyond the periphery of the cell;

an upper packaging layer and a lower packaging layer surrounding the battery cell, wherein the upper and lower packaging layers are sealed together to form a seal area around the periphery of the battery cell and wherein one or both of the anode and cathode tabs extend between the upper and lower packaging material in the seal area;

wherein the method comprises:

placing a multi-layer dielectric sealing film on the anode tab and/or cathode tab in the seal area, wherein the multi-layer dielectric sealing film comprises a layer of dielectric material and a first layer of sealing material;

sealing the upper and lower packaging materials together, wherein the multi-layer dielectric sealing film is sealed between the anode and cathode tabs and the upper packaging material in the seal area.

The sealing material can be a hot melt adhesive. According to some embodiments, the sealing material comprises a polymer selected from the group consisting of acrylics, ethylene acrylic acid (EAA) copolymers, ethylene and ethyl acrylate (EEA) copolymers, ethylene methacrylic acid (EMA) copolymers, ethylene vinyl acetate (EVA) copolymers, polymethyl acrylate (PMA), acrylonitrite, vinyl chloride polypropylene (VCPP) copolymers, acrylic nitrile-butadiene-styrene (ABS) copolymers, polyethylene (PE), polypropylene (PP) and mixtures thereof.

BRIEF DESCRIPTION OF THE DRAWINGS

FIG. 1 is a is an exploded view of a battery comprising a multi-layer film comprising a sealant layer and a dielectric layer between the anode and cathode tabs and the upper packaging material.

DETAILED DESCRIPTION

A battery is described which comprises a multilayer film that acts a dielectric and sealing film. The film comprises at least one layer of a dielectric material and at least one layer of a sealant material.

When sealing a heat sealable pouch it is often necessary to use additional sealing material in the form of a film or tape. This is often required to seal around features, such as battery terminals in a thin film flexible battery, which must traverse the pouch seal and protrude outside of the pouch itself. When the pouch is to have a low moisture transmission rate (MVTR), a metal film, such as aluminum or copper, is often used as part of the pouch film. The multi-layer film described herein can be used to both seal around and electrically isolate anything that protrudes from the pouch.

According to some embodiments, the multi-layer film provides electrical insulation to the battery terminals of a flexible pouch type battery while electrically insulating the battery terminals from the metal used in the pouching foil.

This use of a multi-layer film as described herein eliminates potential shorting between the battery terminals and the pouching foil in a battery. The multi-layer film also provides additional sealant which can flow around and seal around the terminals. By combining the sealant and the dielectric into one dielectric sealing tape assembly, manufacturing steps are eliminated.

According to some embodiments, a thin film of a dielectric material is laminated to, coated with, or otherwise combined with a thin film of sealing material on one, or both, sides to create a dielectric sealing material. This material is then applied as a sealing tape on the seal area of a pouch. In the case of a battery, the dielectric film is placed over the battery terminals in such a manner as to provide electrical insulation between the pouching foil and the battery terminals.

The addition of sealant and dielectric film increases the seal thickness and may decrease the moisture barrier provided by the seal. Selection of thin, low MVTR films and sealants can minimize this effect.

FIG. 1 is an exploded view of an embodiment of a battery comprising a multi-layer sealant and dielectric film. As shown in FIG. 1, the battery comprises an assembled battery cell 801 with two current collector tabs 806, 807, having distal ends 811, 813, extending outwardly from its periphery. The battery cell is disposed above a lower packaging material 800 and below an upper packaging material 808. As shown in FIG. 1, current collector tabs 806, 807 extend outwardly from the periphery of battery cell 806 and are substantially flush with the outer edge 803 of the lower packaging material 800. Thus, the current collector tabs 806, 807 rest on the top of and are supported by the lower packaging material 800. FIG. 1 also illustrates a multi-layer sealant and dielectric film 817 disposed over the current collector tabs 806, 807. The upper packaging material 808 extends over the multi-layer sealant and dielectric film 817. The outer edge 815 of the upper packaging material 808 is also shown in FIG. 1. As can be seen from FIG. 1, if the upper packaging material comprises a metal foil layer, the exposed metal on the outer edge 815 of the upper packaging material 808 may contact the current collector tabs 806, 807 thereby creating a short. In the assembled battery, the multi-layer film 817 would be positioned between the upper packaging material and the upper surfaces of the current collector tabs 806, 807 thereby preventing electrical contact between the edge of the metal foil in the upper packaging material 808 and the current collector tabs 806, 807.

A battery having two tabs extending from the cell is shown in FIG. 1. The sealant and dielectric film can also be used with batteries in which only one tab extends from the cell. In fact, the sealant and dielectric film can be used to seal and electrically isolate any battery feature which extends through the seal around the battery cell.

According to some embodiments, the battery comprises an anode layer, a cathode layer and an electrolyte layer disposed between the anode and cathode layers. An anode current collector tab for delivering electrical energy from the battery cell to an external device is attached to and extends outwardly beyond the periphery of the anode layer. A cathode current collector tab is attached to and extends outwardly beyond the periphery of the cathode. Batteries of this type are described in U.S. patent application Ser. No. 12/466,900, filed on May 15, 2009 and published as U.S. Patent Application Publication No. 20090286150 A1, which is incorporated by reference herein in its entirety. The multi-layer film described herein is used to form a seal around the cathode current collector tab and/or the anode current collector tab.

The anode current collector tab and the cathode current collector can be made from a conductive web or sheet like material. According to some embodiments, the current collector tabs are composed of metal foils such as aluminum, copper, or nickel foils. According to some embodiments, the tabs are made from electrodeposited copper or nickel flashed copper. The current collector tab can be, for example, an electrodeposited copper tab (18 microns). The current collector tabs are desirably thin so that packaging materials may be easily sealed around them. For example, the current collector tabs can have a thickness of no more than about 10 mils and desirably, no more than about 1 mil (where 1 mil=1/1000 inch or 0.0254 millimeters). However, current collector tabs having a thickness outside of these ranges may also be employed. In some embodiments, the current collector tabs may comprise an extension protruding from a larger current collector sheet disposed adjacent an anode or a cathode. According to some embodiments, the tab may comprise a strip of material disposed on, and extending outwardly beyond the edge of, a current collector sheet, an anode or a cathode.

In a preferred embodiment, the battery cell comprises at least two current collector tabs extending from the battery cell. In a preferred embodiment, the battery cell is substantially planar and substantially rectangular, and the current collector tabs extending from the battery cell are substantially planar and substantially rectangular. In a preferred embodiment, the battery comprises a battery cell comprising: (a) an anode, (b) a cathode, (c) an electrolyte disposed between the anode and the cathode; and at least two current collector tabs extending from the battery cell, wherein a first current collector tab is an anode current collector tab extending from the anode, and a second current collector tab is a cathode current collector tab extending from the cathode. The cell can be a substantially rectangular, substantially planar cell with two length sides and two width sides wherein the current collector tabs extend from one width side of the cell. Alternatively, the cell can be a substantially rectangular, substantially planar cell with two length sides and two width sides and the cell comprises at least two current collector tabs extending from one length side of the cell.

The battery cell can include an electrically insulative and moisture and vapor resistant packaging material surrounding the battery cell. The packaging material may be a multilayered packaging material including one or more sealing layers, one or more electrically insulative layers and one or more moisture and/or vapor barrier layers. For example, the outer packaging material may have a binder adhesive coated on at least a portion of its exterior surface to help bind the battery into an electronic device, such as a smart card. The binder adhesive is desirably a heat activated adhesive which activates at temperatures of at least about 100° C. A binder adhesive may also be applied to at least a portion of the interior surface of the packaging material to bind the outer packaging material to the battery cell. This interior binder adhesive can have an activation temperature which is lower than the activation temperature of the exterior binder adhesive.

A single piece of packaging material can be folded over to provide upper and lower packaging materials from a single continuous piece of material. The fold can be on the side of the battery cell opposite the side from which the current collector tabs extend.

The battery can be a lithium metal or lithium ion battery. The battery can be a polymer electrolyte battery. The cell can comprise an electrolyte comprising a soluble polyimide. The electrolyte can be a polymer matrix electrolyte comprising a polyimide, at least one lithium salt and at least one solvent. The lithium salt can be present in a concentration of at least 0.5 moles of lithium per mole of imide ring provided by the polyimide. The polymer matrix electrolyte can be substantially optically clear. The anode can comprise a lithium powder and a polymer binder. The polymer binder can be a high temperature polymer which is heat-resistant. For example, the polymer binder can have a glass transition temperature of at least 100° C., or at least 150° C. The polymer binder can be selected so that it does not react with the lithium powder. According to some embodiments, the polymer binder is a polyimide. According to some embodiments, the lithium powder has an average particle size of no more than about 20 microns. According to some embodiments, the cathode comprises a polyimide, an electronic conductive filler and a metal oxide. According to some embodiments, the electrolyte layer comprises solvent in an amount of about 10 wt. % to about 50 wt. %, and more particularly, about 15 wt. % to about 40 wt. %, and more particularly, about 20 wt. % to about 30 wt. %. The battery can also be a metal hydride (e.g., Ni-MH) or nickel-cadmium (Ni—Cd) battery. The battery may have solid, liquid or polymer electrolytes.

Suitable materials that may be used for the various components of the batteries, including packaging materials, anode and cathode materials, polymer electrolyte materials, and current collector and/or current collector tab materials, are described above including, for example, in U.S. Pat. Nos. 5,057,385; 5,326,653; and 6,145,280, each of which is incorporated by reference herein in its entirety.

According to some embodiments, the sealing material comprises a polymer selected from the group consisting of acrylics, ethylene acrylic acid (EAA) copolymers, ethylene and ethyl acrylate (EEA) copolymers, ethylene methacrylic acid (EMA) copolymers, ethylene vinyl acetate (EVA) copolymers, polymethyl acrylate (PMA), acrylonitrile, vinyl chloride polypropylene (VCPP) copolymers, acrylic nitrile-butadiene-styrene (ABS) copolymers, polyethylene (PE), polypropylene (PP) and mixtures thereof.

According to some embodiments, the dielectric material comprises a polymer selected from the group consisting of polyester (PET) and polyetheretherketone (PEEK). These materials have good heat stability. In addition, PEEK is available in thin grades, and is much more flexible. According to some embodiments, the dielectric material comprises a polymer selected from the group consisting of acrylonitrite (polyacrylonitrile), vinyl chloride (PVC) polypropylene copolymers, acrylic nitrile-butadiene-styrene (ABS) copolymers, polyethylene (PE) and polypropylene (PP).

While the foregoing specification teaches the principles of the present invention, with examples provided for the purpose of illustration, it will be appreciated by one skilled in the art from reading this disclosure that various changes in form and detail can be made without departing from the true scope of the invention.

What is claimed is:

1. A battery comprising:
a battery cell having a periphery, the battery cell comprising an anode, a cathode and an electrolyte between the anode and cathode;
an anode tab comprising a first portion in electrical contact with the anode and a second portion extending beyond the periphery of the cell and/or a cathode tab comprising a first portion in electrical contact with the cathode and a second portion extending beyond the periphery of the cell;
an upper packaging layer and a lower packaging layer surrounding the battery cell, wherein the upper and lower packaging layers are sealed together to form a seal area in a periphery of the battery cell and wherein the anode and/or cathode tabs extend between the upper and lower packaging materials in the seal area; and
a multi-layer dielectric sealing film between the anode tab and/or the cathode tab and the upper packaging material in the seal area, wherein the multi-layer dielectric sealing film comprises a layer of dielectric material and a first layer of sealing material.

2. The battery of claim 1, wherein the upper packaging material comprises a metallic layer.

3. The battery of claim 1, wherein the cathode comprises a cathode current collector layer and a cathode layer and wherein the underlying layer of the cathode is the cathode current collector layer.

4. The battery of claim 1, wherein the sealing material is a hot melt adhesive.

5. The battery of claim 1, wherein the sealing material comprises a polymer selected from the group consisting of acrylics, ethylene acrylic acid (EAA) copolymers, ethylene and ethyl acrylate (EEA) copolymers, ethylene methacrylic acid (EMA) copolymers, ethylene vinyl acetate (EVA) copolymers, polymethyl acrylate (PMA), acrylonitrite, vinyl chloride polypropylene (VCPP) copolymers, acrylic nitrile-butadiene-styrene (ABS) copolymers, polyethylene (PE), polypropylene (PP) and mixtures thereof.

6. The battery of claim 1, wherein the anode and cathode tabs extend beyond the upper packaging material.

7. The battery of claim 1, wherein an outer portion of the lower packaging material extends beyond the seal area and wherein the anode and cathode tabs extend beyond the seal area and are supported by the outer portion of the lower packaging material.

8. The battery of claim 1, wherein the multi-layer dielectric sealing film further comprises a second layer of sealing material, wherein the first and second layers of sealing material sandwich the layer of dielectric material.

9. The battery of claim 1, wherein the battery cell is planar and rectangular.

10. The battery of claim 1, wherein the current anode and cathode tabs are planar and rectangular.

11. The battery of claim 1, wherein the cell is rectangular with two length sides having a first length and two width sides having a second length;
wherein the first length is greater than the second length; and
wherein the anode and cathode tabs extend from one width side of the cell.

12. The battery of claim 1, wherein the cell is rectangular with two length sides having a first length and two width sides having a second length;
wherein the first length is greater than the second length; and
wherein the anode and cathode tabs extend from one length side of the cell.

13. The method of claim 1, wherein the first layer of sealing material is in contact with the anode tab and/or the cathode tab.

14. A method of packaging a battery, the battery comprising:
an anode, a cathode and an electrolyte between the anode and cathode forming a battery cell having a periphery;

an anode tab comprising a first portion in electrical contact with the anode and a second portion extending beyond the periphery of the cell and/or a cathode tab comprising a first portion in electrical contact with the cathode and a second portion extending beyond the periphery of the cell;

an upper packaging layer and a lower packaging layer surrounding the battery cell, wherein the upper and lower packaging layers are sealed together to form a seal area outside the periphery of the battery cell and wherein one or both of the anode and cathode tabs extend between the upper and lower packaging material in the seal area; the method comprising:

placing a multi-layer dielectric sealing film on the anode tab and/or cathode tab in the seal area, wherein the multi-layer dielectric sealing film comprises a layer of dielectric material and a first layer of sealing material;

sealing the upper and lower packaging materials together, wherein the multi-layer dielectric sealing film is sealed between the anode and cathode tabs and the upper packaging material in the seal area.

15. The method of claim 14, wherein the upper packaging material comprises a metallic layer.

16. The method of claim 14, wherein the cathode comprises a cathode current collector layer and a cathode layer and wherein the underlying layer of the cathode is the cathode current collector layer.

17. The method of claim 14, wherein the sealing material is a hot melt adhesive.

18. The method of claim 14, wherein the sealing material comprises a polymer selected from the group consisting of acrylics, ethylene acrylic acid (EAA) copolymers, ethylene and ethyl acrylate (EEA) copolymers, ethylene methacrylic acid (EMA) copolymers, ethylene vinyl acetate (EVA) copolymers, polymethyl acrylate (PMA), acrylonitrite, vinyl chloride polypropylene (VCPP) copolymers, acrylic nitrile-butadiene-styrene (ABS) copolymers, polyethylene (PE), polypropylene (PP) and mixtures thereof.

19. The method of claim 14, wherein the anode and cathode tabs extend beyond the upper packaging material.

20. The method of claim 14, wherein an outer portion of the lower packaging material extends beyond the seal area and wherein the anode and cathode tabs extend beyond the seal area and are supported by the outer portion of the lower packaging material.

21. The method of claim 14, wherein the multi-layer dielectric sealing film further comprises a second layer of sealing material, wherein the first and second layers of sealing material sandwich the layer of dielectric material.

22. The method of claim 14, wherein the battery cell is planar and rectangular.

23. The method of claim 14, wherein the current anode and cathode tabs are planar and rectangular.

24. The method of claim 14, wherein the cell is rectangular with two length sides having a first length and two width sides having a second length;

wherein the first length is greater than the second length; and wherein the anode and cathode tabs extend from one width side of the cell.

25. The method of claim 14, wherein the cell is rectangular with two length sides having a first length and two width sides having a second length;

wherein the first length is greater than the second length; and wherein the anode and cathode tabs extend from one length side of the cell.

26. The method of claim 14, wherein the first layer of sealing material is in contact with the anode tab and/or the cathode tab.

27. The battery of claim 1, wherein the dielectric material comprises a polymer selected from the group consisting of polyester (PET) or polyetheretherketone (PEEK), acrylonitrite (polyacrylonitrile), vinyl chloride (PVC), polypropylene copolymers, acrylic nitrile-butadiene-styrene (ABS) copolymers, polyethylene (PE) and polypropylene (PP).

28. The method of claim 14, wherein the dielectric material comprises a polymer selected from the group consisting of polyester (PET) or polyetheretherketone (PEEK), acrylonitrite (polyacrylonitrile), vinyl chloride (PVC), polypropylene copolymers, acrylic nitrile-butadiene-styrene (ABS) copolymers, polyethylene (PE) and polypropylene (PP).

* * * * *